US012638382B2

(12) United States Patent
Kim et al.

(10) Patent No.: US 12,638,382 B2
(45) Date of Patent: May 26, 2026

(54) CLOTHES CARE APPARATUS AND CONTROL METHOD THEREOF

(71) Applicant: SAMSUNG ELECTRONICS CO., LTD., Suwon-si (KR)

(72) Inventors: Yumee Kim, Suwon-si (KR); Soomin Park, Seoul (KR); Jangpyo Park, Suwon-si (KR); Joonho Kim, Suwon-si (KR); Yongwon Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 198 days.

(21) Appl. No.: 18/389,451

(22) Filed: Nov. 14, 2023

(65) Prior Publication Data

US 2024/0085315 A1     Mar. 14, 2024

Related U.S. Application Data

(63) Continuation of application No. PCT/KR2022/008135, filed on Jun. 9, 2022.

(30) Foreign Application Priority Data

Jun. 10, 2021   (KR) ........................ 10-2021-0075720
Oct. 26, 2021   (KR) ........................ 10-2021-0143337

(51) Int. Cl.
*G01N 21/31* (2006.01)
*D06F 43/00* (2006.01)
(Continued)

(52) U.S. Cl.
CPC ............. *G01N 21/31* (2013.01); *D06F 43/00* (2013.01); *D06F 34/18* (2020.02); *D06F 58/10* (2013.01);
(Continued)

(58) Field of Classification Search
CPC ......... G01N 21/31; D06F 73/02; D06F 58/10; D06F 34/18; D06F 43/00; D06F 58/36;
(Continued)

(56) References Cited

U.S. PATENT DOCUMENTS 10,563,338 B2    2/2020   Chen et al.
11,429,822 B2    8/2022   Chae
(Continued)

FOREIGN PATENT DOCUMENTS

CN         102720034 A    10/2012
CN         112771224 A     5/2021
(Continued)

OTHER PUBLICATIONS

Communication issued on Jul. 22, 2024 by the European Patent Office in European Patent Application No. 22820578.7.
(Continued)

*Primary Examiner* — Benjamin L Osterhout
(74) *Attorney, Agent, or Firm* — Sughrue Mion, PLLC

(57) ABSTRACT

A clothes care apparatus includes a main body including a clothes care chamber configured to accommodate one or more clothes items; an optical sensor module configured to photograph an inside of the clothes care chamber, the optical sensor module including a plurality of light receiving elements, each being sensitive to different wavelength bands; and a processor configured to: acquire, from the plurality of light receiving elements, a sensing value for the one or more clothes items, acquire spectroscopic data for the one or more clothes items based on the sensing value, acquire feature information corresponding to the one or more clothes items based on the spectroscopic data, input the feature information into a trained neural network model, acquire, from the trained neural network model, information on materials of the one or more clothes items accommodated in the clothes (Continued)

START

ACQUIRE SPECTROSCOPIC DATA FOR CLOTHES HOUSED IN THE CLOTHES CARE CHAMBER BASED ON A SENSING VALUE ACQUIRED BY A PLURALITY OF LIGHT RECEIVING ELEMENTS — S1010

ACQUIRE FEATURE INFORMATION CORRESPONDING TO THE CLOTHES HOUSED IN THE CLOTHES CARE CHAMBER BASED ON THE SPECTROSCOPIC DATA — S1020

INPUT THE FEATURE INFORMATION INTO A TRAINED NEURAL NETWORK MODEL AND ACQUIRE INFORMATION ON THE MATERIALS OF THE CLOTHES HOUSED IN THE CLOTHES CARE CHAMBER — S1030

DETERMINE AN OPERATION COURSE OF THE CLOTHES CARE APPARATUS BASED ON THE INFORMATION ON THE MATERIALS OF THE CLOTHES HOUSED IN THE CLOTHES CARE CHAMBER — S1040

END care chamber, and determine an operation course of the clothes care apparatus.

20 Claims, 11 Drawing Sheets

(51) Int. Cl.

| | |
|---|---|
| *D06F 34/18* | (2020.01) |
| *D06F 58/10* | (2006.01) |
| *D06F 58/36* | (2020.01) |
| *D06F 73/02* | (2006.01) |
| *D06F 103/00* | (2020.01) |
| *D06F 103/64* | (2020.01) |
| *D06F 105/52* | (2020.01) |
| *G06N 3/08* | (2023.01) |

(52) U.S. Cl.
CPC .............. *D06F 58/36* (2020.02); *D06F 73/02* (2013.01); *D06F 2103/00* (2020.02); *D06F 2103/64* (2020.02); *D06F 2105/52* (2020.02); *G06N 3/08* (2013.01)

(58) Field of Classification Search
CPC ............. D06F 2103/64; D06F 2103/00; D06F 2105/52; G06N 3/08
See application file for complete search history.

(56) References Cited

U.S. PATENT DOCUMENTS

| | | | | |
|---|---|---|---|---|
| 11,447,905 | B2 | 9/2022 | Lee et al. | |
| 11,460,817 | B2 * | 10/2022 | Kim | G06V 40/169 |
| 11,568,501 | B2 | 1/2023 | Kessler et al. | |
| 2018/0060937 | A1 | 3/2018 | Shu et al. | |
| 2019/0067344 | A1 | 2/2019 | Geelen | |
| 2019/0385017 | A1 * | 12/2019 | Hwang | G06F 18/214 |
| 2020/0019766 | A1 | 1/2020 | Choi et al. | |
| 2020/0040508 | A1 | 2/2020 | Park | |
| 2020/0042822 | A1 | 2/2020 | Chae | |
| 2020/0056321 | A1 * | 2/2020 | Jeong | D06F 58/36 |
| 2020/0096954 | A1 | 3/2020 | Kim et al. | |
| 2020/0116627 | A1 | 4/2020 | Kessler et al. | |
| 2021/0140091 | A1 | 5/2021 | Choi | |
| 2021/0214874 | A1 | 7/2021 | Iancu et al. | |
| 2022/0031068 | A1 | 2/2022 | Jang et al. | |
| 2022/0034023 | A1 | 2/2022 | Hong et al. | |

FOREIGN PATENT DOCUMENTS

| | | | | |
|---|---|---|---|---|
| CN | 112831976 A | 5/2021 | | |
| DE | 10 2016 212 976 A1 | 1/2018 | | |
| DE | 10 2016 212 979 A1 | 1/2018 | | |
| EP | 3674466 A1 * | 7/2020 | .............. | G06N 3/08 |
| KR | 10-2019-0104485 A | 9/2019 | | |
| KR | 10-2019-0106924 A | 9/2019 | | |
| KR | 10-2020-0018375 A | 2/2020 | | |
| KR | 10-2020-0019523 A | 2/2020 | | |
| KR | 10-2020-0030472 A | 3/2020 | | |
| KR | 20200030999 A * | 3/2020 | ......... | G06V 10/7788 |
| KR | 10-2020-0065886 A | 6/2020 | | |
| KR | 10-2021-0044888 A | 4/2021 | | |
| WO | 2018/155291 A1 | 8/2018 | | |
| WO | WO-2020050990 A1 * | 3/2020 | ............. | G06N 3/092 |
| WO | 2020/111616 A1 | 6/2020 | | |
| WO | WO-2020138523 A1 * | 7/2020 | .............. | G06N 3/08 |
| WO | WO-2021129296 A1 * | 7/2021 | ............. | D06F 58/32 |

OTHER PUBLICATIONS

Communication issued on Oct. 14, 2024 by the European Patent Office in European Patent Application No. 22820578.7.

International Search Report (PCT/ISA/210) issued on Sep. 30, 2022 by the International Searching Authority in International Patent Application No. PCT/KR2022/008135.

Written Opinion (PCT/ISA/237) issued on Sep. 30, 2022 by the International Searching Authority in International Patent Application No. PCT/KR2022/008135.

Communication dated Dec. 23, 2025, issued by the China National Intellectual Property Administration in Chinese Application No. 202280041028.2.

\* cited by examiner

FIG. 8

$$\underset{72}{\underline{\text{FEATURES}}} = \sum_{a=1}^{r} w_a \cdot f_n(\lambda, k) = w_1 \cdot \begin{bmatrix} \lambda_1 & \cdots & \lambda_k \\ \vdots & \ddots & \vdots \\ \lambda_{k(n-1)+1} & \cdots & \lambda_{kn} \end{bmatrix} + w_2 \cdot \begin{bmatrix} \Delta\lambda_1 & \cdots & \Delta\lambda_{(k-1)} \\ \vdots & \ddots & \vdots \\ \Delta\lambda_{(k-1)(n-1)+1} & \cdots & \Delta\lambda_{(k-1)n} \end{bmatrix}$$

81   82

CLOTHES CARE APPARATUS AND CONTROL METHOD THEREOF

CROSS-REFERENCE TO RELATED APPLICATIONS

This application is a continuation of International Application No. PCT/KR2022/008135, filed on Jun. 9, 2022, which claims priority to Korean Patent Application No. 10-2021-0075720, filed on Jun. 10, 2021, and Korean Patent Application No. 10-2021-0143337, filed on Oct. 26, 2021, in the Korean Intellectual Property Office, the disclosures of which are incorporated by reference herein their entireties.

BACKGROUND

1. Field

The disclosure relates to a clothes care apparatus and a control method thereof, and more particularly, to a clothes care apparatus that acquires a material of clothes and cares the clothes based on the acquired material, and a control method thereof.

2. Description of Related Art

A clothes care apparatus is an apparatus that performs clothes managing operations such as removal of odor of clothes, removal of fine dust, drying, removal of wrinkles, sterilization, dehumidification, etc. For preventing damage to clothes and managing clothes effectively, it is important to correctly identify the material and state of the clothes.

As a conventional technology for identifying a material of clothes, there is a method of contacting a spectrometer with the clothes and analyzing a resulting spectrum. However, since there is a possibility that the clothes may be polluted during the contact with the clothes, and a manual manipulation of the spectrometer is necessary, the conventional technology has a problem that it is difficult to be applied to a clothes care apparatus.

Accordingly, there is a need for a technology for correctly identifying a material of clothes without contacting the clothes.

SUMMARY

Provided are clothes care apparatus that may predict a material of clothes, and identify a degree of wrinkles, and a control method thereof.

Further, provided are clothes care apparatus that may determine an operation course based on at least one of a material of clothes or a degree of wrinkles, and a control method thereof.

Additional aspects will be set forth in part in the description which follows and, in part, will be apparent from the description, or may be learned by practice of the presented embodiments.

According to an aspect of the disclosure, a clothes care apparatus includes: a main body including a clothes care chamber configured to accommodate one or more clothes items; an optical sensor module configured to photograph an inside of the clothes care chamber, the optical sensor module including a plurality of light receiving elements arranged in an array, each of the plurality of light receiving elements being sensitive to different wavelength bands; and a processor configured to: acquire, from the plurality of light receiving elements, a sensing value for the one or more clothes items accommodated in the clothes care chamber, acquire spectroscopic data for the one or more clothes items accommodated in the clothes care chamber based on the sensing value, acquire feature information corresponding to the one or more clothes items accommodated in the clothes care chamber based on the spectroscopic data, input the feature information into a trained neural network model, acquire, from the trained neural network model, information on materials of the one or more clothes items accommodated in the clothes care chamber, and determine an operation course of the clothes care apparatus based on the information on the materials of the one or more clothes items accommodated in the clothes care chamber.

The spectroscopic data may include pixel information of the optical sensor module for each wavelength band sensitive to a respective light receiving element among the plurality of light receiving elements.

A number of the different wavelength bands sensitive to the plurality of light receiving elements constituting pixels of the optical sensor module may be at least four.

Light receiving elements, among the plurality of light receiving elements of the optical sensor module, corresponding to a first pixel among a plurality of pixels of the optical sensor module may be configured to sense different wavelength bands.

Light receiving elements, among the plurality of light receiving elements of the optical sensor module, corresponding to a first pixel among a plurality of pixels of the optical sensor module may be configured to sense a same wavelength band.

The processor may be further configured to acquire the feature information based on intensities of lights for the different wavelength bands sensitive to the plurality of light receiving elements and a difference among intensities of lights corresponding to adjacent wavelength bands among the different wavelength bands.

The processor may be further configured to: reduce a dimension of the spectroscopic data by using linear discriminant analysis, and acquire the feature information based on the spectroscopic data in which the dimension of the spectroscopic data is reduced.

The optical sensor module may include a light emitting part, and the processor may be further configured to: acquire flight time data of a light output from the light emitting part, acquire depth information corresponding to the one or more clothes items accommodated in the clothes care chamber based on the flight time data, and determine the operation course of the clothes care apparatus based on the depth information.

The optical sensor module may include: a first light receiving element among the plurality of light receiving elements is configured to detect a light output from the light emitting part included in the optical sensor module, and reflected on the one or more clothes items accommodated in the clothes care chamber, and a second light receiving element among the plurality of light receiving elements is configured to detect intensities of lights for the respective wavelength bands.

The first light receiving element and the second light receiving element may be the same.

The clothes care apparatus may further include a display, wherein the one or more clothes items include a plurality of clothes items, and the processor may be further configured to: determine whether the plurality of clothes items can be processed at a same time based on information on the materials of the plurality of clothes items accommodated in the clothes care chamber, and based on determining that the plurality of clothes items cannot be processed at the same time, control the display to output a guide message regarding clothes care.

The clothes care apparatus may further include a communication interface including a communication circuit, wherein the processor may be further configured to: receive weather information from an external server through the communication interface, and determine the operation course of the clothes care apparatus based on the weather information.

According to an aspect of the disclosure a control method of a clothes care apparatus including a main body including a clothes care chamber configured to accommodate one or more clothes items, and an optical sensor module configured to photograph an inside of the clothes care chamber, the optical sensor module including a plurality of light receiving elements arranged in an array, each of the plurality of light receiving elements being sensitive to different wavelength bands, includes: acquiring, from the plurality of light receiving elements, a sensing value for the one or more clothes items accommodated in the clothes care chamber; acquiring spectroscopic data for the one or more clothes items accommodated in the clothes care chamber based on the sensing value; acquiring feature information corresponding to the one or more clothes items accommodated in the clothes care chamber based on the spectroscopic data; inputting the feature information into a trained neural network model; acquiring, from the trained neural network model, information on materials of the one or more clothes items accommodated in the clothes care chamber; and determining an operation course of the clothes care apparatus based on the information on the materials of the one or more clothes items accommodated in the clothes care chamber.

The spectroscopic data may include pixel information of the optical sensor module for each wavelength band sensitive to a respective light receiving element among the plurality of light receiving elements.

A number of the different wavelength bands sensitive to the plurality of light receiving elements constituting pixels of the optical sensor module may be at least four.

Light receiving elements, among the plurality of light receiving elements of the optical sensor module, corresponding to a first pixel among a plurality of pixels of the optical sensor module may be configured to sense different wavelength bands.

Light receiving elements, among the plurality of light receiving elements of the optical sensor module, corresponding to a first pixel may be configured to sense a same wavelength band.

The acquiring the feature information may include: acquiring the feature information based on intensities of lights for the different wavelength bands sensitive to the plurality of light receiving elements and a difference among intensities of lights corresponding to adjacent wavelength bands among the different wavelength bands.

The acquiring the feature information may include: reducing a dimension of the spectroscopic data by using linear discriminant analysis; and acquiring the feature information based on the spectroscopic data in which the dimension of the spectroscopic data is reduced.

The control method may further include: acquiring depth information corresponding to the one or more clothes items accommodated in the clothes care chamber by using the optical sensor module; and acquiring wrinkle information for the one or more clothes items accommodated in the clothes care chamber based on the depth information, and the determining the operation course of the clothes care apparatus may include determining the operation course of the clothes care apparatus based on the information on the materials of the one or more clothes items and the wrinkle information.

According to one or more embodiments of the disclosure, a clothes care apparatus may predict a material of clothes and identify a degree of wrinkles without a contact with the clothes. Also, a clothes care apparatus may automatically determine an operation course based on at least one of a material of clothes or a degree of wrinkles. Accordingly, a user's satisfaction and convenience can be improved.

In addition to the above, effects that that can be obtained or predicted from the embodiments of the disclosure will be directly or implicitly described in the detailed description for the embodiments of the disclosure. For example, various effects predicted according to the embodiments of the disclosure will be described in the detailed description that will be described below.

Also, other aspects, advantages, and noticeable characteristics of the disclosure will become clear to a person skilled in the pertaining technical field from the following detailed description disclosing various embodiments of the disclosure with reference to the accompanying drawings.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8 is a formula indicating feature information according to one or more embodiments of the disclosure;

DETAILED DESCRIPTION

Figure 1:
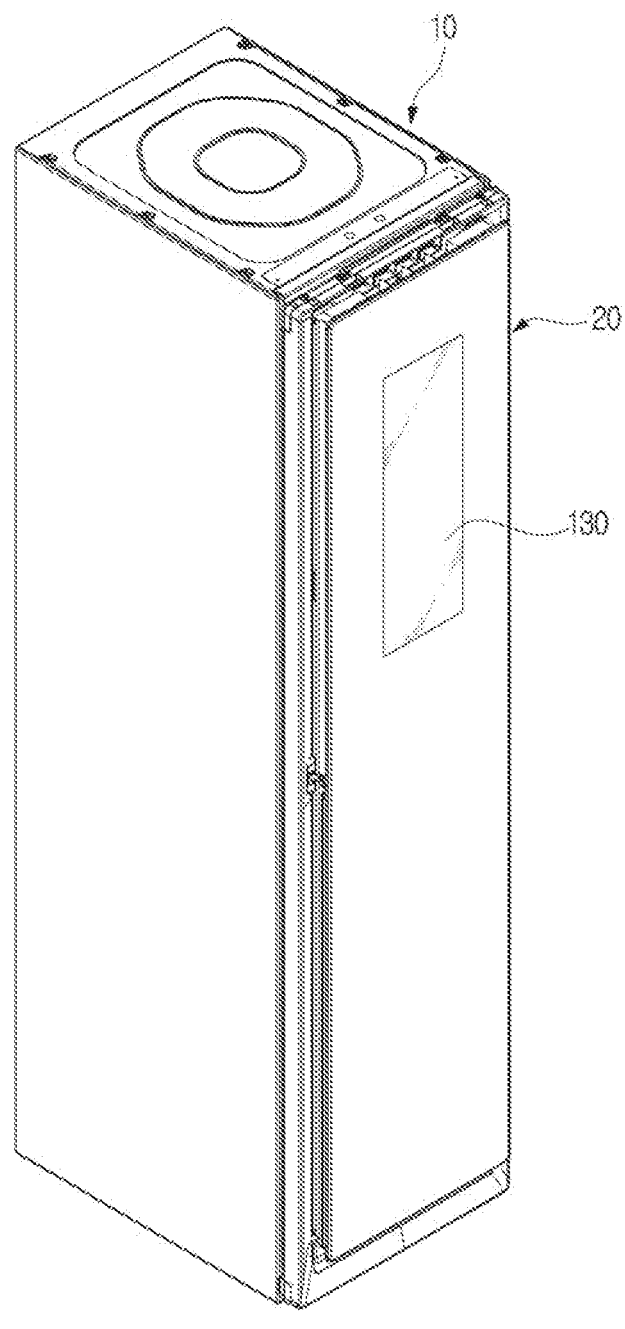
FIG. 1 is a perspective view of a clothes care apparatus according to one or more embodiments of the disclosure.

First, terms used in this specification will be described briefly, and then certain example embodiments of the disclosure will be described in detail.

As terms used in the embodiments of the disclosure, general terms that are currently used widely were selected as far as possible, in consideration of the functions described in the disclosure. However, the terms may vary depending on the intention of those skilled in the art who work in the pertinent technical field or previous court decisions, emergence of new technologies, etc. Also, in particular cases, there may be terms that were arbitrarily designated by the applicant, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents, or alternatives of the embodiments included in the idea and the technical scope disclosed herein. Further, in describing the embodiments, in case it is determined that detailed explanation of related known technologies may unnecessarily confuse the gist of the disclosure, the detailed explanation will be omitted.

In addition, terms such as "first," "second" and the like may be used to describe various elements, but the terms are not intended to limit the elements. Such terms are used only to distinguish one element from another element.

Further, singular expressions include plural expressions, as long as they do not obviously mean differently in the context. Also, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Hereinafter, the embodiments of the disclosure will be described in detail with reference to the accompanying drawings, such that those having ordinary skill in the art to which the disclosure belongs can easily carry out the disclosure. However, it should be noted that the disclosure may be implemented in various different forms, and is not limited to the embodiments described herein. Also, in the drawings, parts that are not related to explanation were omitted, for explaining the disclosure clearly, and throughout the specification, similar components were designated by similar reference numerals.

Figure 2:
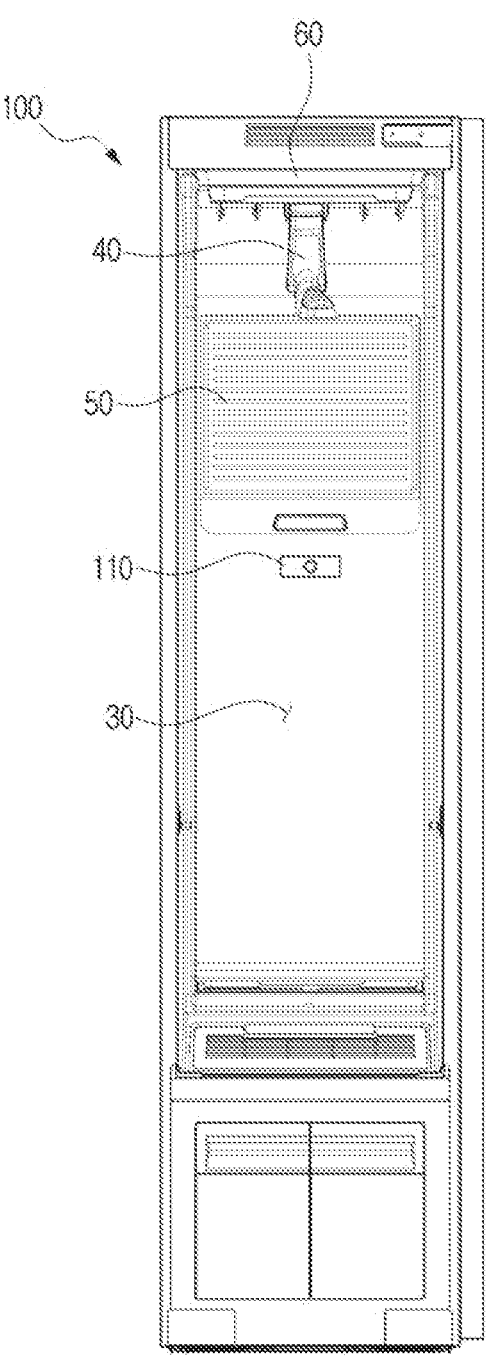
FIG. 2 is a diagram illustrating an appearance wherein a door of the clothes care apparatus illustrated in FIG. 1 is open according to one or more embodiments.

FIG. 1 is a perspective view of a clothes care apparatus according to one or more embodiments of the disclosure. FIG. 2 is a diagram illustrating an appearance wherein a door of the clothes care apparatus illustrated in FIG. 1 is open.

Referring to FIG. 1 and FIG. 2, the clothes care apparatus 100 may include a main body 10 forming the exterior of the clothes care apparatus 100, and a door 20 that is rotatably coupled to the main body 10. The door 20 may include a display 130 for making a user manipulate the clothes care apparatus 100 or for providing a guide message. In one or more embodiments, the clothes care apparatus 100 may include a clothes care chamber 30 that is provided inside the main body 10 and wherein clothes are housed and cared, a clothes supporting member 40 that is provided inside the clothes care chamber 30 to hold clothes, and a filter member 50 for removal of dust or deodorization. Further, the clothes care apparatus 100 may include a light emitting module 60 that is provided inside the clothes care chamber 30 and provides a light to the inside of the clothes care chamber 30. Although the light emitting module 60 is illustrated as being on a top surface of the clothes care chamber 30, the light emitting module 60 may be located on any surface of the clothes care apparatus. In one or more examples, the clothes care apparatus 100 may include a plurality of light emitting modules 60 positioned at different locations of the clothes care apparatus 100.

The clothes care apparatus 100 may include an optical sensor module 110 that is provided to photograph the inside of the clothes care chamber 30. Meanwhile, in FIG. 2, it is illustrated that the optical sensor module 110 is provided on the side surface of the clothes care chamber 30. However, this configuration is merely an example, and the optical sensor module 110 may be provided in various locations of the clothes care chamber 30. For example, the optical sensor module 110 may be provided on the top surface of the clothes care chamber 30 to photograph the lower part.

In one or more examples, the clothes care apparatus 100 may further include a machine chamber wherein a heat exchange apparatus is provided to dehumidify or heat the air inside the clothes care chamber 30, a steam generation apparatus generating steam, and an air blowing apparatus for providing hot wind to clothes.

Figure 3:
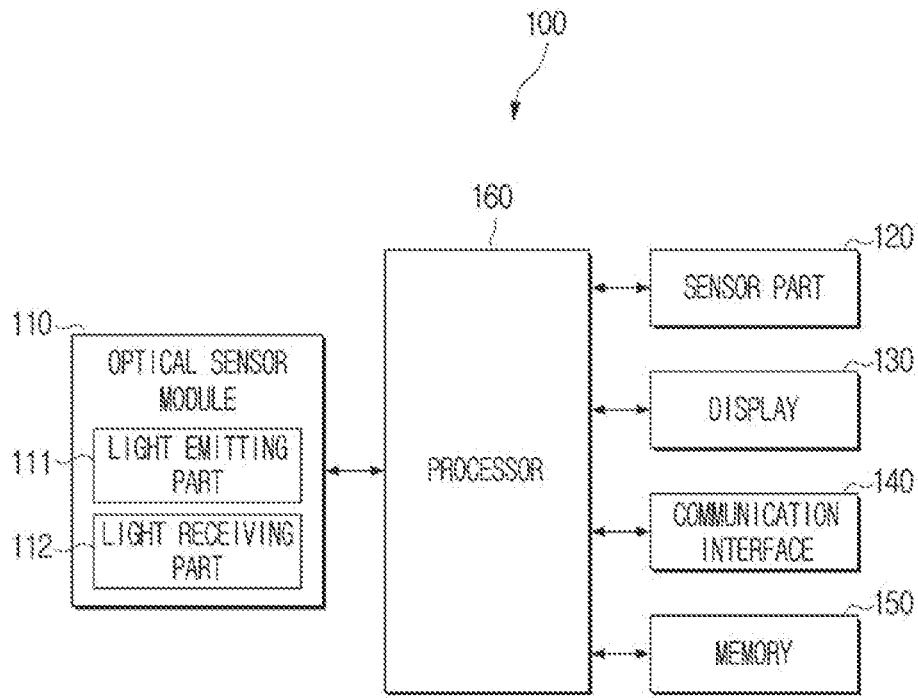
FIG. 3 is a block diagram illustrating a configuration of a clothes care apparatus according to one or more embodiments of the disclosure.

FIG. 3 is a block diagram illustrating a configuration of a clothes care apparatus according to one or more embodiments of the disclosure.

Referring to FIG. 3, the clothes care apparatus 100 may include an optical sensor module 110, a sensor part 120, a display 130, a communication interface 140, a memory 150, and a processor 160.

The optical sensor module 110 is a component for acquiring spectroscopic data and depth information for clothes provided in the clothes care chamber 30. In one or more embodiments, the optical sensor module 110 may include a light emitting part 111 and a light receiving part 112.

The light emitting part 111 may irradiate a light to the clothes provided in the clothes care chamber 30. The processor 160 may acquire Time of Flight (ToF) data of the light irradiated by the light emitting part 111. In one or more embodiments, the TOF data may correspond to a distance between two points. For example, the processor 160 may acquire ToF data based on a difference between a first time point when a light was emitted by the light emitting part 111 and a second time point when the emitted light was acquired by the light receiving part 112 after being reflected on the clothes provided in the clothes care chamber 30. Alternatively, in one or more embodiments, the processor 160 may acquire ToF data calculated by the optical sensor module 110. In one or more embodiments, the light emitting part 111 may include a light emitting diode (LED) outputting an infrared light, and a laser diode (LD).

The light receiving part 112 may include a plurality of light receiving elements, each of which is sensitive to different wavelength bands. The light receiving elements may include a photo diode (PD). The light receiving part 112 may acquire spectroscopic data for clothes by using the plurality of light receiving elements. The spectroscopic data may correspond to strengths (e.g., intensities) of lights for the plurality of wavelength bands. An optical signal collected by the plurality of light receiving elements may be converted into an electronic signal, and spectroscopic data may be acquired.

The plurality of light receiving elements may be arranged in a form of an array, and constitute the pixels of the optical sensor module 110. In one or more embodiments, wavelength bands sensitive to a plurality of light receiving elements corresponding to one pixel may be different from one another. For example, a first light receiving element, a second light receiving element, and a third light receiving element corresponding to a first pixel may sense different wavelength bands from one another. Alternatively, in one or more, wavelength bands sensitive to a plurality of light receiving elements corresponding to one pixel may be the same. Here, the plurality of respective pixels may correspond to different wavelength bands from one another. For example, the first pixel may include a plurality of light receiving elements sensing a first wavelength band, and the second pixel may include a plurality of light receiving elements sensing a second wavelength band. More detailed explanation regarding the arrangement form of the plurality of light receiving elements will be made later with reference to FIG. 5 and FIG. 6.

The sensor part 120 may include a sensor configured to detect various information regarding the clothes care apparatus 100. For example, the sensor part 120 may include a temperature sensor configured to detect the temperature of the clothes care chamber 30. Also, in one or more embodiments, the sensor part 120 may include a humidity sensor configured to detect the humidity of the clothes care chamber 30. The processor 160 may determine the degree of care of clothes based on the humidity of the clothes care chamber 30. For example, if the humidity of the clothes care chamber 30 is greater than a predetermined value, the processor 160 may determine that a current degree of care for clothes is insufficient. Here, the processor 160 may control the display 130 to output a guide message regarding an additional clothes managing operation.

The display 130 may display various screens by control by the processor 160. For example, the display 130 may display information regarding an operation course of the clothes care apparatus 100. The display 130 may be implemented as a touch display, and acquire a user input. For example, the display 130 may acquire a user input of selecting a specific operation course. Also, in one or more embodiments, the display 130 may output an image which photographed the inside of the clothes care chamber 30. An image which photographed the inside of the clothes care chamber 30 may be acquired by the optical sensor module 110.

The communication interface 140 may include at least one circuit, and perform communication with various types of external apparatuses or external servers. For example, the communication interface 140 may receive weather information from an external server. Here, the processor 160 may identify an operation course of the clothes care apparatus 100 based on the weather information. For example, if the concentration of fine dust is greater than a predetermined value, the processor 160 may identify a fine dust removal course that provides refreshed air. Alternatively, in one or more embodiments, if it rains or the external humidity is greater than a predetermined value, the processor 160 may identify a dehumidification course.

The communication interface 140 may include at least one of a Bluetooth Low Energy (BLE) module, a Wi-Fi communication module, a cellular communication module, a 3rd Generation (3G) mobile communication module, a 4th Generation (4G) mobile communication module, a 4th Generation Long Term Evolution (LTE) communication module, or a 5th Generation (5G) mobile communication module, or any other communication module known to one of ordinary skill in the art.

The memory 150 may store an operating system (OS) for controlling the overall operations of the components of the clothes care apparatus 100 and instructions or data related to the components of the clothes care apparatus 100. For example, the memory 150 may store information on an operation course of the clothes care apparatus 100. An operation course means a series of operation information for managing clothes. An operation course may include at least one operation section information and time information corresponding to the operation section.

An operation course of the clothes care apparatus 100 may include a standard course of providing steam to clothes, and thereby removing wrinkles of the clothes, removing dust existing on the clothes, and performing sterilization of the clothes. In one or more embodiments, there may be various operation courses for care of clothes such as a dust removal course of providing air to clothes, thereby removing dust on the clothes, etc. Operation courses of the clothes care apparatus 100 may be classified according to types of clothes (e.g., formal suits, school uniforms, blouses, denims, etc.) and materials of clothes (e.g., wool, cotton, rayon, silk, polyester, etc.).

An operation course for a wool material may include time information corresponding to an amount of time required to perform an operation. For example, the time information may correspond to the time of providing steam is two minutes, the time of dispersing the provided steam is three minutes, and the time for stabilizing the steam is 0.5 minute. Also, in one or more embodiments, an operation course for a cotton material may include time information that the time of providing steam is two minutes, the time of dispersing the provided steam is five minutes, and the time for stabilizing the steam is 0.5 minute. Further, an operation course for a silk material or a rayon material may include time information that the time of providing steam is 0 minute, the time of dispersing the provided steam is three minutes, and the time for stabilizing the steam is 0 minute.

Also, in one or more embodiments, the memory 150 may store information for clothes of each user and use history information. A user and type information of the clothes of the user may be matched and stored in the memory 150. For example, the clothes care apparatus 100 may be associated with a group of users including a father, a mother, and a child. The father may be matched to a formal suit, the mother may be matched to a blouse, and the child may be matched to a school uniform. In one or more embodiments, the memory 150 may be implemented as a non-volatile memory (ex: a hard disc, a solid state drive (SSD), a flash memory), a volatile memory, etc.

The processor 160 may be electronically connected with the memory 150, and control the overall functions and operations of the clothes care apparatus 100. For example, the processor 160 may acquire spectroscopic data for clothes housed in the clothes care chamber 30 based on a sensing value acquired by the plurality of light receiving elements. The spectroscopic data may include pixel information of the optical sensor module 110 for the plurality of respective wavelength bands sensitive to the plurality of light receiving elements.

The processor 160 may acquire feature information corresponding to the clothes housed in the clothes care chamber based on the spectroscopic data. For example, the feature information may include a first feature vector indicating strengths (e.g., intensities) of lights for the plurality of respective wavelength bands and a second feature vector indicating a difference among strengths (e.g., intensities) of lights for adjacent wavelength bands. The processor 160 may apply a weight to each of the first feature vector and the second feature vector and acquire feature information. In one or more embodiments, a strength of a light may correspond to a luminance value of the light.

The processor 160 may input the feature information into a neural network model, and acquire information on materials of the clothes housed in the clothes care chamber 30. The neural network model may be an artificial intelligence model trained to predict materials of clothes based on feature information. The neural network model may be trained based on learning data including spectroscopic data for respective materials of clothes.

In one or more embodiments, the processor 160 may perform pre-processing for the feature information, and input the pre-processed feature information into the neural network model. For example, the processor 160 may reduce the dimension of the spectroscopic data by using Linear Discriminant Analysis (LDA). The processor 160 may acquire feature information based on the spectroscopic data of which dimension is reduced. For example, LDA may be used to combine correlated data such that the dimension of the spectroscopic data is reduced. If the feature information acquired based on the spectroscopic data of which dimension was reduced is input into the neural network model, an operation amount for prediction of materials of clothes may be reduced. Accordingly, the memory capacity can be cared effectively.

The processor 160 may acquire ToF data of a light output from the light emitting part 111, and acquire depth information corresponding to the clothes housed in the clothes care chamber 30 based on the ToF data. The processor 160 may identify the degree of wrinkles of the clothes based on the depth information. The processor 160 may determine the operation course of the clothes care apparatus 100 based on the degree of wrinkles of the clothes. For example, as the degree of wrinkles of the clothes is bigger, the processor 160 may increase the injection amount of steam.

The processor 160 may control the display 130 to output a guide message regarding clothes care. For example, the processor 160 may determine whether a plurality of clothes can be cared (e.g., processed) at a same time based on the information on the materials of the plurality of clothes housed in the clothes care chamber 30. If it is determined that the plurality of clothes cannot be cared at the same time, the processor 160 may control the display 130 to output a guide message regarding clothes care (e.g., "Cotton/silk detected. I recommend proceeding with each course").

In one or more embodiments, functions related to artificial intelligence according to the disclosure are operated through the processor 160 and the memory 150. The processor 160 may include one processor or a plurality of processors. In one or more examples, the one processor or the plurality of processors may be generic-purpose processors such as a CPU, an AP, a digital signal processor (DSP), etc., graphics-dedicated processors such as a GPU and a vision processing unit (VPU), or artificial intelligence-dedicated processors such as an NPU. The one or plurality of processors perform control such that input data is processed according to pre-defined operation rules or an artificial intelligence model stored in the memory 150. Alternatively, in one or more examples, in case the one or plurality of processors are artificial intelligence-dedicated processors, the artificial intelligence-dedicated processors may be designed as a hardware structure specified for processing of a specific artificial intelligence model.

A predefined operation rule or an artificial intelligence model may be trained through learning. Here, an artificial intelligence model is trained by using a plurality of learning data by a learning algorithm, where a predefined operation rule or an artificial intelligence model set to perform a desired characteristic (or, purpose) is generated based on the training. Such learning may be performed in an apparatus where artificial intelligence is performed itself according to the disclosure, or performed through a separate server and/or system. The learning algorithms may include supervised learning, unsupervised learning, semi-supervised learning, or reinforcement learning. However, the learning algorithms are not limited to the aforementioned examples, and may include any suitable learning algorithm known to one of ordinary skill in the art.

An artificial intelligence model may be trained through learning. Here, an artificial intelligence model is trained by using a plurality of learning data by a learning algorithm, where a predefined operation rule or an artificial intelligence model set to perform a desired characteristic (or, purpose) is generated based on the training. An artificial intelligence model may include a plurality of neural network layers. Each of the plurality of neural network layers has a plurality of weight values, and performs an operation of the neural network layer through an operation between the operation result of the previous layer and the plurality of weight values. The plurality of weight values included by the plurality of neural network layers may be optimized by the learning result of the artificial intelligence model. For example, the plurality of weight values may be updated such that a loss value or a cost value acquired at the artificial intelligence model during a learning process is reduced or minimized.

Also, in one or more embodiments, an artificial intelligence model may be processed by an artificial intelligence-dedicated processor which is designed as a hardware structure specified for processing of an artificial intelligence model. An artificial intelligence model may be made through learning. Here, an artificial intelligence model is trained by using a plurality of learning data by a learning algorithm, and a predefined operation rule or an artificial intelligence model set to perform a desired characteristic (or, purpose) is generated based on the training. An artificial intelligence model may comprise of a plurality of neural network layers. Each of the plurality of neural network layers may include a plurality of weight values, and performs an operation of the neural network layer through an operation between the operation result of the previous layer and the plurality of weight values.

An artificial neural network may include, for example, a deep neural network (DNN), a convolutional neural network (CNN), a recurrent neural network (RNN), a generative adversarial network (GAN), a restricted Boltzmann machine (RBM), a deep belief network (DBN), a bidirectional recurrent deep neural network (BRDNN), or deep Q-networks, etc. However, the artificial neural network is not limited to the aforementioned examples and may include any suitable neural network known to one of ordinary skill in the art.

In one or more embodiments, the clothes care apparatus 100 may include an adaptive echo canceller (AEC) module for pre-processing a user voice, a noise suppression (NS) module, an end-point detection (EPD) module, or an automatic gain control (AGC) module. In one or more embodiments, the clothes care apparatus 100 may include a digital signal processor (DSP) that changes an analog voice signal to a digital signal, or changes a digital voice signal to an analog signal.

Figure 4:
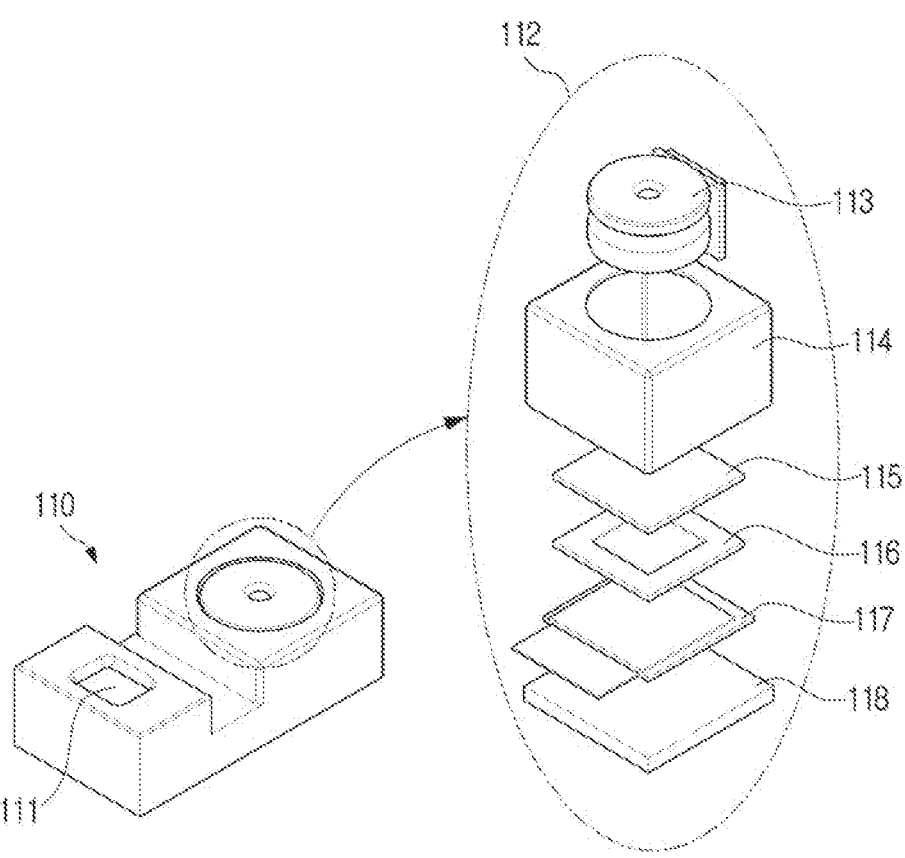
FIG. 4 is a diagram illustrating an optical sensor module according to one or more embodiments of the disclosure.

FIG. 4 is a diagram illustrating an optical sensor module according to one or more embodiments of the disclosure.

Referring to FIG. 4, the optical sensor module 110 may include a light emitting part 111. The clothes care apparatus 100 may acquire depth information corresponding to the clothes housed in the clothes care chamber 30 based on ToF data of a light output from the light emitting part 111. The clothes care apparatus 100 may identify a degree of wrinkles of the clothes based on the depth information. The clothes care apparatus 100 may determine the operation course of the clothes care apparatus 100 based on the degree of wrinkles of the clothes. For example, the degree of wrinkles may be specified as an integer scale, where a value of "0" indicates little to no wrinkles, and values greater than "0" indicate higher amounts of wrinkle.

The optical sensor module 110 may include a light receiving part 112. The light receiving part 112 may include a lens module 113, an auto focus actuator 114, an optical filter 115, a light receiving element array 116, a printed circuit board (PCB) 117, and an image signal processor (ISP) 118.

The light receiving element array 116 may include a plurality of light receiving elements, each of which is sensitive to different wavelength bands, and which are arranged in a form of an array. For example, the light receiving elements may include a photo diode (PD). The clothes care apparatus 100 may acquire spectroscopic data for the clothes provided in the clothes care chamber 30 based on the strength of a light acquired through the plurality of light receiving elements.

In one or more embodiments, the light receiving part 112 may include a first light receiving element which detects a light that was output from the light emitting part 111, and then reflected on the clothes housed in the clothes care chamber 30, and a second light receiving element which detects strengths of lights for the plurality of respective wavelength bands (e.g., the light receiving element array 116). Here, the first light receiving element and the second light receiving element may be implemented in an integrated form. For example, the light receiving element array 116 may detect a light that was output from the light emitting part 111, and then reflected on the clothes housed in the clothes care chamber 30. Alternatively, in one or more embodiments, the first light receiving element and the second light receiving element may be implemented separately. Here, the first light receiving element may be provided in a location separate from the light receiving element array 116.

In one or more embodiments, the light amount inside the clothes care chamber 30 is limited, and accordingly, the size of the aperture of the lens module 113 needs to be increased for collecting lights in the largest amount possible. If the depth of the field decreases as the size of the aperture increases, a problem in which the focusing varies according to the depth or the curve of the clothes may occur. To resolve this problem, the light receiving part 112 may include an auto focus actuator 114. The auto focus actuator 114 may drive the lens module 113 so that the focus is formed on the clothes provided inside the clothes care chamber 30. The auto focus actuator 114 may adjust the focus based on various methods such as a method of detecting a phase difference, a method of detecting a contrast, etc.

Figure 5:
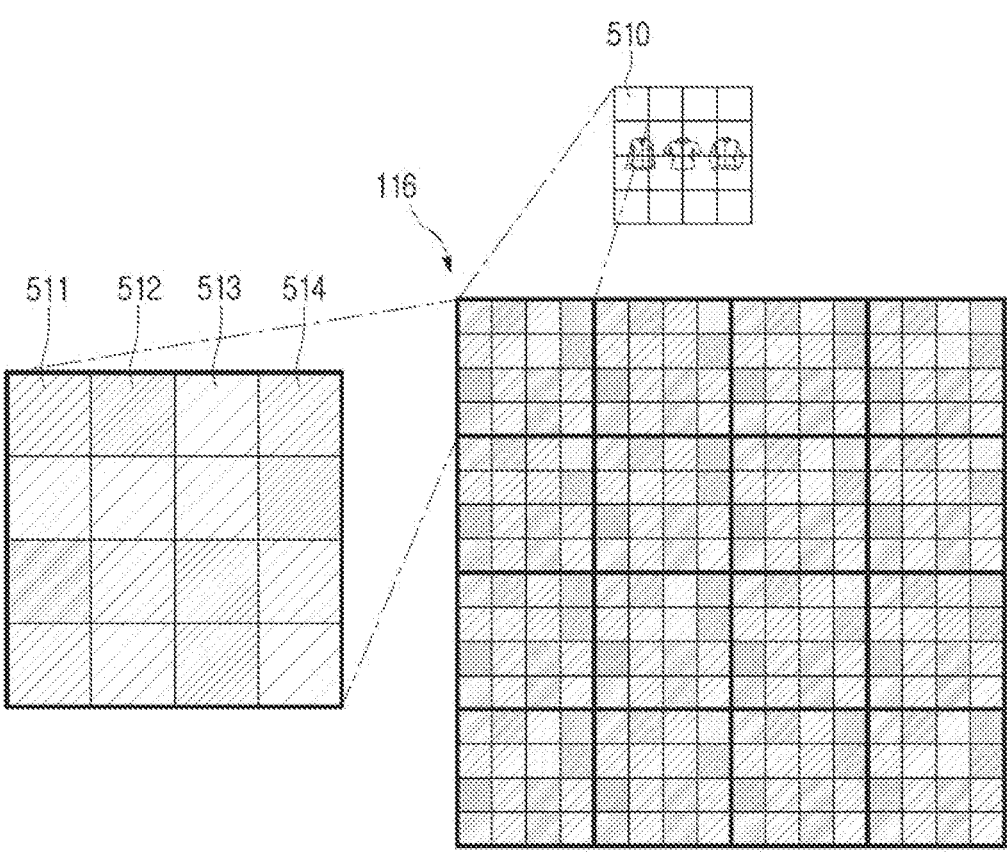
FIG. 5 is a diagram illustrating a light receiving element array according to one or more embodiments of the disclosure.

FIG. 5 is a diagram illustrating a light receiving element array according to one or more embodiments of the disclosure.

Referring to FIG. 5, the light receiving element array 116 may include a plurality of light receiving elements corresponding to the plurality of pixels of the optical sensor module 110. For example, a plurality of light receiving elements 511, 512, 513, and 514, corresponding to the first pixel 510 may be arranged in an array form. Here, the plurality of light receiving elements 511, 512, 513, and 514, may sense lights of different wavelength bands from one another. For example, the first light receiving element 511 may sense a light of 300-400 nm, the second light receiving element 512 may sense a light of 400-500 nm, the third light receiving element 513 may sense a light of 500-600 nm, and the fourth light receiving element 514 may sense a light of 600-700 nm.

The clothes care apparatus 100 may acquire spectroscopic data for clothes based on a sensing value of the light receiving element array 116. The spectroscopic data may correspond to strengths (e.g., intensities) of lights acquired by the light receiving elements for the plurality of respective wavelength bands. The spectroscopic data may be expressed in a form of a graph indicating strengths of lights according to the wavelength bands. As an example of spectroscopic data for clothes varies according to the materials of the clothes, the clothes care apparatus 100 may determine the materials of the clothes based on the spectroscopic data. Specifically, the clothes care apparatus 100 may acquire a feature vector based on the spectroscopic data, and acquire information on the materials of the clothes by inputting the feature vector into the neural network model.

As described above, materials of clothes may be predicted based on spectroscopic data. Therefore, it is important to acquire spectroscopic data including sufficient information for predicting materials of clothes correctly. A conventional image sensor acquires strengths of lights corresponding to only three kinds of wavelength bands R, G, B per pixel. For example, as the number of wavelength bands is limited to three, prediction of materials with high accuracy was not possible. In contrast, the clothes care apparatus 100 resulting from the embodiments of the present disclosure may acquire information for at least four wavelength bands per pixel. As a result the clothes care apparatus resulting from the embodiments of the present disclosure provide the significantly advantageous feature of predicting materials of clothes with higher accuracy.

Figure 6:
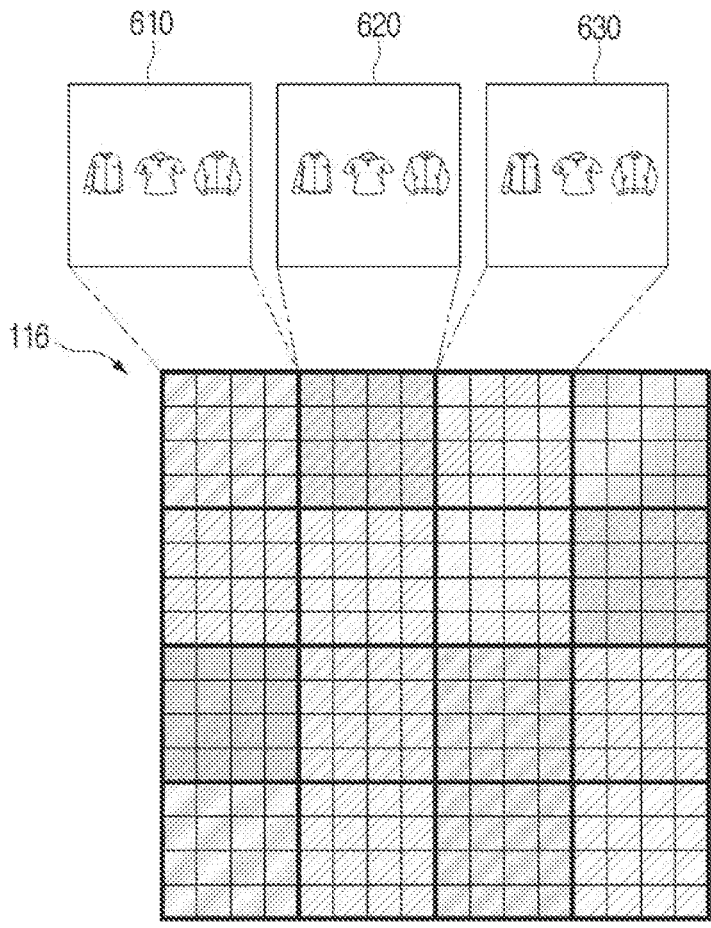
FIG. 6 is a diagram illustrating a light receiving element array according to one or more embodiments of the disclosure.

FIG. 6 is a diagram illustrating a light receiving element array according to one or more embodiments of the disclosure.

Referring to FIG. 6, the light receiving element array 116 may include a plurality of light receiving elements corresponding to the plurality of pixels of the optical sensor module 110. For example, the light receiving element array 116 may include a plurality of light receiving elements respectively corresponding to the first pixel 610, the second pixel 620, and the third pixel 630. The first pixel 610, the second pixel 620, and the third pixel 630 may correspond to different wavelengths from one another. Also, in one or more embodiments, the first pixel 610, the second pixel 620, and the third pixel 630 may correspond to the same space.

The plurality of light receiving elements corresponding to the first pixel 610, the second pixel 620, and the third pixel 630 may be arranged in a form of an array. Here, all of the plurality of light receiving elements corresponding to one pixel may sense lights of the same wavelength band. For example, the plurality of light receiving elements corresponding to the first pixel 610 may sense the first wavelength band, the plurality of light receiving elements corresponding to the second pixel 620 may sense the second wavelength band, and the plurality of light receiving elements corresponding to the third pixel 630 may sense the third wavelength band.

Figure 7:
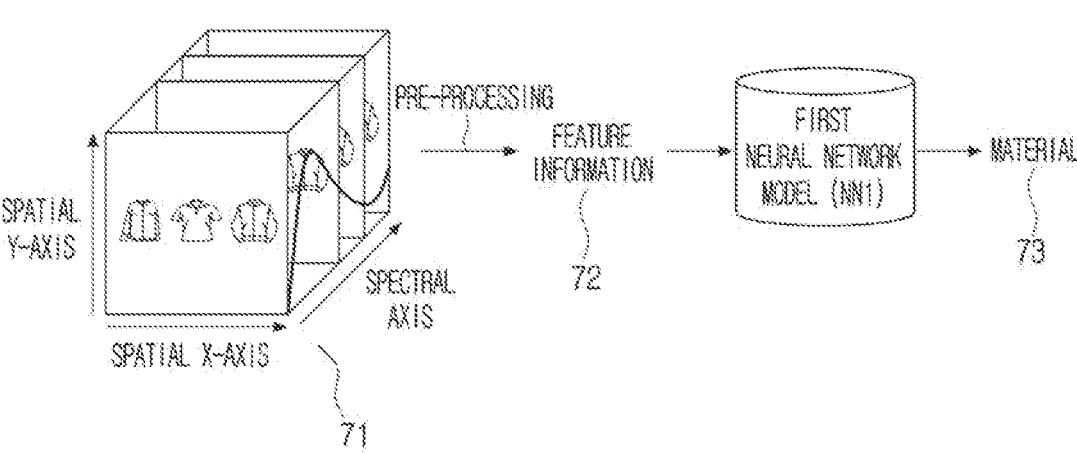
FIG. 7 is a diagram for illustrating a method of acquiring information on materials of clothes according to one or more embodiments of the disclosure.

FIG. 7 is a diagram for illustrating a method of acquiring information on materials of clothes according to one or more embodiments of the disclosure.

Referring to FIG. 7, the clothes care apparatus 100 may acquire spectroscopic data 71 for clothes housed in the clothes care chamber. The clothes care apparatus 100 may perform pre-processing for the spectroscopic data 71, and acquire feature information 72 corresponding to the clothes. For example, the clothes care apparatus 100 may reduce the dimension of the spectroscopic data 71 by using Linear Discriminant Analysis (LDA). The clothes care apparatus 100 may acquire the feature information 72 based on the spectroscopic data of which dimension was reduced. The clothes care apparatus 100 may input the feature information 72 into a first neural network model NN1, and acquire information on the materials 73 of the clothes. The first neural network model NN1 may be an artificial intelligence model trained to predict materials of clothes based on feature information.

FIG. 8 is a formula indicating feature information according to one or more embodiments of the disclosure.

In FIG. 8, w corresponds to a weight value, λ corresponds to a strength of a light, κ corresponds to the number of wavelengths, n corresponds to the number of clothes, Δλ corresponds to the spectrum change ratio for one clothes, and r means the number of feature vectors. The clothes care apparatus 100 may acquire the feature information 72 based on the formula in FIG. 8. The feature information 72 may be defined as a sum of the first feature vector 81 and the second feature vector 82. The first feature vector 81 may include a plurality of elements indicating strengths of lights for the plurality of respective wavelength bands. The second feature vector 82 may include a plurality of elements indicating the spectrum change ratio (e.g., a difference in strengths of lights between wavelength bands). For example, the spectrum change ratio for the first clothes may include a first spectrum change ratio which is a difference between the strength of a light in the first wavelength band and the strength of a light in the second wavelength band. The first wavelength band and the second wavelength band may be wavelength bands adjacent to each other. Alternatively, in one or more embodiments, the first wavelength band and the second wavelength band may be wavelength bands which are different from each other as much as a predetermined wavelength. In one or more embodiments, in FIG. 8, the number of feature vectors is two. However, as understood by one of ordinary skill in the art, this configuration is merely an example, and the number of feature vectors may be three or more.

Figure 9:
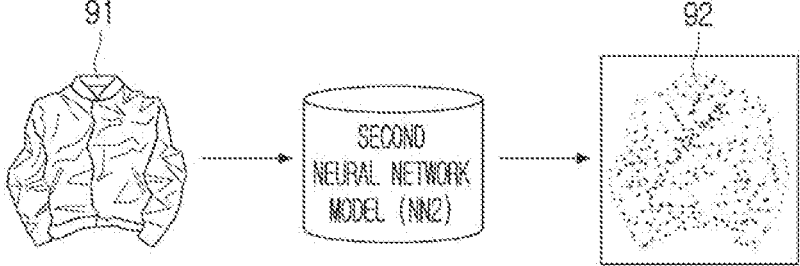
FIG. 9 is a diagram for illustrating a method of determining an operation course of a clothes care apparatus according to one or more embodiments of the disclosure.

FIG. 9 is a diagram for illustrating a method of determining an operation course of a clothes care apparatus according to one or more embodiments of the disclosure.

Referring to FIG. 9, the clothes care apparatus 100 may acquire depth information 91 for clothes by using the optical sensor module 110. For example, the optical sensor module 110 may include at least one of a ToF camera or a stereo camera. The clothes care apparatus 100 may input the depth information 91 for clothes into a second neural network model NN2, and acquire wrinkle information 92 of the clothes. The second neural network model NN2 may be an artificial intelligence model trained to acquire the degree of wrinkles of clothes based on depth information for the clothes.

The clothes care apparatus 100 may determine an operation course based on the wrinkle information 92 of the clothes. For example, as the degree of wrinkles is more severe, the clothes care apparatus 100 may increase the injection amount of steam. In one or more embodiments, the clothes care apparatus 100 may determine an operation course based on the information on the materials of the clothes and the wrinkle information of the clothes. For example, the clothes care apparatus 100 may input the information on the materials of the clothes and the wrinkle information of the clothes into a third neural network model, and acquire an operation course. Here, the third neural network model may be an artificial intelligence model trained to acquire an operation course of the clothes care apparatus 100 based on the information on the materials of the clothes and the wrinkle information of the clothes.

In one or more embodiments, the clothes care apparatus 100 may acquire the number of clothes housed in the clothes care chamber 30 based on audio data. This feature may be performed because, even if the fan is driven in the same strength, the audio data may vary according to the number of clothes housed in the clothes care chamber 30. For example, the audio data and the number of clothes may be matched with each other and stored in the clothes care apparatus 100 in advance. While the fan provided inside the clothes care chamber 30 is being driven, the clothes care apparatus 100 may acquire first audio data by using the microphone provided inside the clothes care chamber 30. The clothes care apparatus 100 may determine similarity of the first audio data and the audio data stored in advance. The clothes care apparatus 100 may identify second audio data of which similarity with the first audio data is bigger than a predetermined value among the audio data stored in advance. The clothes care apparatus 100 may identify the number of the clothes corresponding to the second audio data, and acquire the number of the clothes housed in the clothes care chamber 30. The clothes care apparatus 100 may determine the operation course of the clothes care apparatus 100 based on the number of the clothes housed in the clothes care chamber 30.

Figure 10:
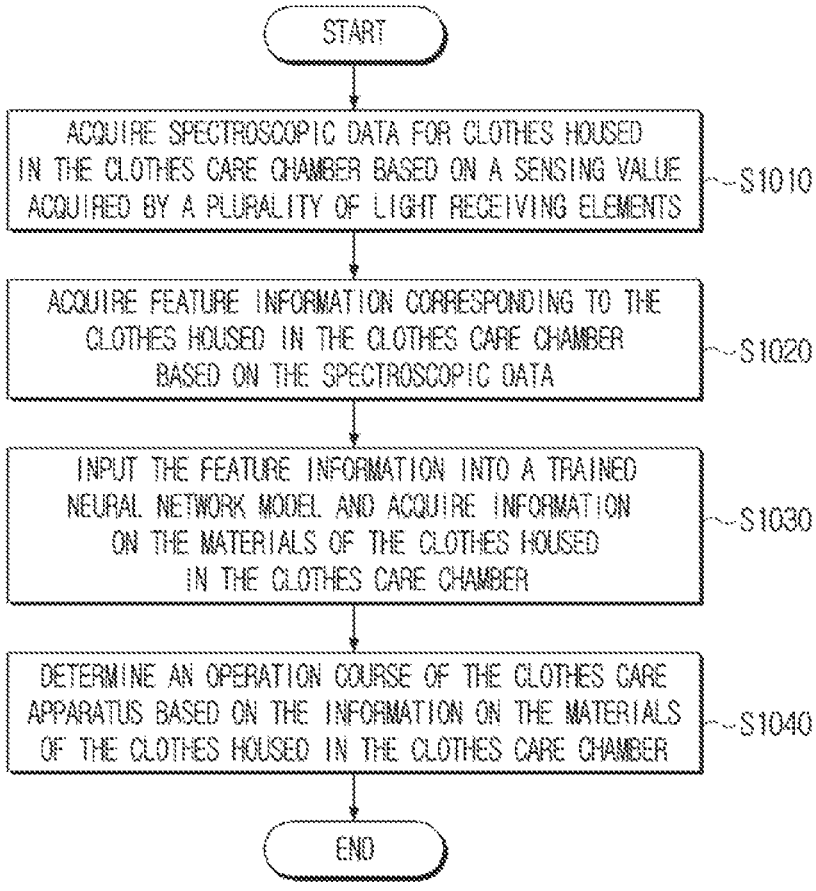
FIG. 10 is a flow chart for illustrating a control method of a clothes care apparatus according to one or more embodiments of the disclosure.

FIG. 10 is a flow chart for illustrating a control method of a clothes care apparatus according to one or more embodiments of the disclosure.

Referring to FIG. 10, the clothes care apparatus 100 may acquire spectroscopic data for clothes housed in the clothes care chamber based on a sensing value acquired by a plurality of light receiving elements in operation S1010. The spectroscopic data may include pixel information of the optical sensor module for a plurality of respective wavelength bands sensitive to the plurality of light receiving elements.

The clothes care apparatus 100 may acquire feature information corresponding to the clothes housed in the clothes care chamber based on the spectroscopic data in operation S1020. The clothes care apparatus 100 may reduce the dimension of the spectroscopic data by using linear discriminant analysis, and acquire the feature information based on the spectroscopic data of which a dimension may be reduced.

The clothes care apparatus 100 may input the feature information into a trained neural network model, and acquire information on the materials of the clothes housed in the clothes care chamber in operation S1030. The clothes care apparatus 100 may determine whether the acquired material information corresponds to the actual material information of the clothes through a user feedback. For example, the clothes care apparatus 100 may display a message requesting confirmation of the material information (e.g., "The material of the clothes was identified as a wool material. Is it correct?"). Subsequently, the clothes care apparatus 100 may acquire a user instruction confirming the material information.

In one or more embodiments, in case a plurality of clothes are housed in the clothes care apparatus 100, the clothes care apparatus 100 may determine whether the plurality of clothes can be cared at the same time based on material information for the plurality of respective clothes. In case the plurality of clothes cannot be cared at the same time (e.g., in case the first clothes is a cotton material, and the second clothes is a silk material), the clothes care apparatus 100 may output a guide message regarding clothes care (e.g., "Cotton/silk detected. I recommend proceeding with each course").

In case the materials of the plurality of clothes are different, the clothes care apparatus 100 may determine the operation course based on sensitivity of each clothes. For example, in case the sensitivity of the second clothes is bigger than the sensitivity of the first clothes, the clothes care apparatus 100 may determine the operation course based on the material of the second clothes. Information on the sensitivity of each material of clothes may be stored in the clothes care apparatus 100 in advance.

In one or more embodiments, the clothes care apparatus 100 may determine a possibility of damage to clothes based on the material information of the clothes. If it is determined that there is a possibility of damage to the clothes, the clothes care apparatus 100 may output a message notifying the possibility of damage (e.g., "As the clothes is a fur material, damage may occur if it is cared in a course including a steam process").

The clothes care apparatus 100 may determine the operation course of the clothes care apparatus based on the information on the materials of the clothes housed in the clothes care chamber in operation S1040. For example, in case the clothes housed in the clothes care chamber is a wool material, the clothes care apparatus 100 may determine the first operation course including time information that the time of providing steam is two minutes, the time of dispersing the provided steam is three minutes, and the time for stabilizing the steam is 0.5 minute. Alternatively, in one or more embodiments, in case the clothes housed in the clothes care chamber is a cotton material, the clothes care apparatus 100 may determine the second operation course including time information that the time of providing steam is two minutes, the time of dispersing the provided steam is five minutes, and the time for stabilizing the steam is 0.5 minute.

In one or more embodiments, in the clothes care apparatus 100, operation courses for each type of clothes may be stored in advance. The clothes care apparatus 100 may acquire types of clothes based on the information on the materials of the clothes. The clothes care apparatus 100 may identify operation courses corresponding to the types of clothes. For example, the types of clothes may include formal suits, school uniforms, and blouses.

Figure 11:
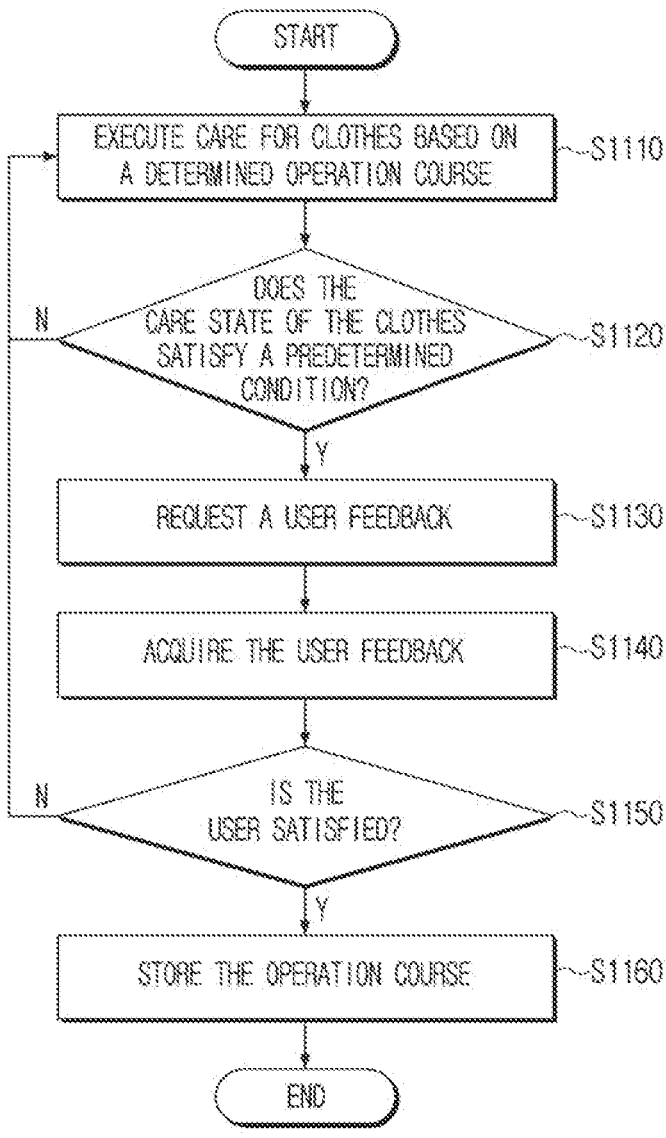
FIG. 11 is a flow chart for illustrating a control method of a clothes care apparatus according to one or more embodiments of the disclosure.

FIG. 11 is a flow chart for illustrating a control method of a clothes care apparatus according to one or more embodiments of the disclosure.

Referring to FIG. 11, the clothes care apparatus 100 may execute care for clothes based on a determined operation course in operation S1110. When the operation course is completed, the clothes care apparatus 100 may determine whether the care state of the clothes satisfies a predetermined condition in operation S1120. For example, if the humidity of the clothes care chamber 30 is within a predetermined humidity range, the clothes care apparatus 100 may determine that the care state of the clothes satisfies the predetermined condition. If the humidity of the clothes care chamber 30 is outside the predetermined humidity range, the clothes care apparatus 100 may determine that the care state of the clothes does not satisfy the predetermined condition. In case it was determined that the care state of the clothes does not satisfy the predetermined condition in operation S1120—N, the clothes care apparatus 100 may additionally execute care for the clothes.

In case it is determined that the care state of the clothes satisfies the predetermined condition in operation S1120—Y, the clothes care apparatus 100 may request a user feedback in operation S1130. For example, the clothes care apparatus 100 may output a message requesting a feedback ("Care of the formal suit has been completed. Are you satisfied with the care?"). The clothes care apparatus 100 may acquire a user feedback in operation S1140. Subsequently, the clothes care apparatus 100 may determine whether the user is satisfied with the clothes care based on the user feedback in operation S1150. In case it is determined that the user was not satisfied with the clothes care in operation S1150—N, the clothes care apparatus 100 may additionally execute care for the clothes. In case it is determined that the user was satisfied with the clothes care in operation S1150—Y, the clothes care apparatus 100 may store the executed operation course in operation S1160.

In one or more embodiments, the various embodiments described above may be implemented in a recording medium that can be read by a computer or an apparatus similar to a computer, by using software, hardware, or a combination thereof. In some cases, the embodiments described in this specification may be implemented as a processor itself. According to implementation by software, the embodiments such as procedures and functions described in this specification may be implemented as separate software modules. Each of the software modules can perform one or more functions and operations described in this specification.

In one or more embodiments, computer instructions for performing processing operations according to the aforementioned various embodiments of the disclosure may be stored in a non-transitory computer-readable medium. Computer instructions stored in such a non-transitory computer-readable medium may make the processing operations according to the aforementioned various embodiments performed by a specific machine, when the instructions are executed by the processor of the specific machine.

A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a CD, a DVD, a hard disc, a blue-ray disc, a USB, a memory card, a ROM and the like.

In one or more embodiments, a storage medium that is readable by machines may be provided in the form of a non-transitory storage medium. Here, the term 'a non-transitory storage medium' only means that the device is a tangible device, and does not include a signal (e.g.: an electronic wave), and the term does not distinguish a case wherein data is stored semi-permanently in a storage medium and a case wherein data is stored temporarily. For example, 'a non-transitory storage medium' may include a buffer wherein data is temporarily stored.

According to one or more embodiments, methods according to the various embodiments disclosed herein may be provided while being included in a computer program product. A computer program product refers to a product, and it can be traded between a seller and a buyer. A computer program product can be distributed in the form of a storage medium that is readable by machines (e.g.: a compact disc read only memory (CD-ROM)), or distributed directly on-line (e.g.: download or upload) through an application store (e.g.: Play Store™), or between two user apparatuses (e.g.: smartphones). In the case of on-line distribution, at least a portion of a computer program product (e.g.: a download-able app) may be stored in a storage medium readable by machines such as the server of the manufacturer, the server of the application store, and the memory of the relay server at least temporarily, or may be generated temporarily.

Also, while example embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. A clothes care apparatus comprising:
a main body comprising a clothes care chamber config-
   ured to accommodate one or more clothes items;
an optical sensor module configured to photograph an
   inside of the clothes care chamber, the optical sensor
   module comprising:
a light emitting part in the clothes care chamber;
a plurality of light receiving elements arranged in an
   array, each of the plurality of light receiving elements
   being sensitive to different wavelength bands, each of
   the plurality of light receiving elements being config-
   ured to receive light that is output from the light
   emitting part and reflected from the one or more clothes
   items accommodated in the clothes care chamber, and
   generate a sensing value for the one or more clothes
   items accommodated in the clothes care chamber based
   on the received light; and
a processor configured to:
   acquire, from the plurality of light receiving elements,
      the sensing value,
   acquire spectroscopic data for the one or more clothes
      items accommodated in the clothes care chamber
      based on the sensing value,
   acquire feature information corresponding to the one or
      more clothes items accommodated in the clothes care
      chamber based on the spectroscopic data,
   input the feature information into a trained neural
      network model,
   acquire, from the trained neural network model, infor-
      mation on materials of the one or more clothes items
      accommodated in the clothes care chamber, and
   determine an operation course of the clothes care
      apparatus based on the information on the materials
      of the one or more clothes items accommodated in
      the clothes care chamber.

2. The clothes care apparatus of claim 1, wherein the spectroscopic data comprises pixel information of the opti-cal sensor module for each wavelength band sensitive to a respective light receiving element among the plurality of light receiving elements.

3. The clothes care apparatus of claim 1, wherein a number of the different wavelength bands sensitive to the plurality of light receiving elements constituting pixels of the optical sensor module is at least four.

4. The clothes care apparatus of claim 1, wherein light receiving elements, among the plurality of light receiving elements of the optical sensor module, corresponding to a first pixel among a plurality of pixels of the optical sensor module are configured to sense different wavelength bands.

5. The clothes care apparatus of claim 1, wherein light receiving elements, among the plurality of light receiving elements of the optical sensor module, corresponding to a first pixel among a plurality of pixels of the optical sensor module are configured to sense a same wavelength band.

6. The clothes care apparatus of claim 1, wherein the processor is further configured to:
   acquire the feature information based on intensities of
      lights for the different wavelength bands sensitive to
      the plurality of light receiving elements and a differ-
      ence among intensities of lights corresponding to adja-
      cent wavelength bands among the different wavelength
      bands.

7. The clothes care apparatus of claim 1, wherein the processor is further configured to:
   reduce a dimension of the spectroscopic data by using
      linear discriminant analysis, and
   acquire the feature information based on the spectroscopic
      data in which the dimension of the spectroscopic data
      is reduced.

8. The clothes care apparatus of claim 1, wherein
   the processor is further configured to:
   acquire flight time data of a light output from the light
      emitting part,
   acquire depth information corresponding to the one or
      more clothes items accommodated in the clothes care
      chamber based on the flight time data, and
   determine the operation course of the clothes care appa-
      ratus based on the depth information.

9. The clothes care apparatus of claim 8, wherein the optical sensor module comprises:
   a first light receiving element among the plurality of light
      receiving elements is configured to detect the light
      output from the light emitting part and reflected on the
      one or more clothes items accommodated in the clothes
      care chamber, and
   a second light receiving element among the plurality of
      light receiving elements is configured to detect inten-
      sities of lights for the respective wavelength bands.

10. The clothes care apparatus of claim 9, wherein the first light receiving element and the second light receiving ele-ment are the same.

11. The clothes care apparatus of claim 1, further com-prising:
   a display,
   wherein the one or more clothes items comprise a plu-
      rality of clothes items, and wherein the processor is
      further configured to:
      determine whether the plurality of clothes items can be
         processed at a same time based on information on the
         materials of the plurality of clothes items accommo-
         dated in the clothes care chamber, and
      based on determining that the plurality of clothes items
         cannot be processed at the same time, control the
         display to output a guide message regarding clothes
         care.

12. The clothes care apparatus of claim 1, further com-prising:
   a communication interface comprising a communication
      circuit, wherein the processor is further configured to:

receive weather information from an external server through the communication interface, and determine the operation course of the clothes care apparatus based on the weather information.

13. A control method of a clothes care apparatus comprising a main body comprising a clothes care chamber configured to accommodate one or more clothes items, and an optical sensor module configured to photograph an inside of the clothes care chamber, the optical sensor module comprising a light emitting part in the clothes care chamber and a plurality of light receiving elements arranged in an array, each of the plurality of light receiving elements being sensitive to different wavelength bands, each of the plurality of light receiving elements configured to receive light that is output from the light emitting part and reflected from the one or more clothes items accommodated in the clothes care chamber, the control method comprising:

acquiring, from the plurality of light receiving elements, a sensing value for the one or more clothes items accommodated in the clothes care chamber, the sensing value being generated based on the light received by the plurality of light receiving elements;

acquiring spectroscopic data for the one or more clothes items accommodated in the clothes care chamber based on the sensing value;

acquiring feature information corresponding to the one or more clothes items accommodated in the clothes care chamber based on the spectroscopic data;

inputting the feature information into a trained neural network model;

acquiring, from the trained neural network model, information on materials of the one or more clothes items accommodated in the clothes care chamber; and determining an operation course of the clothes care apparatus based on the information on the materials of the one or more clothes items accommodated in the clothes care chamber.

14. The control method of claim 13, wherein the spectroscopic data comprises pixel information of the optical sensor module for each wavelength band sensitive to a respective light receiving element among the plurality of light receiving elements.

15. The control method of claim 13, wherein a number of the different wavelength bands sensitive to the plurality of light receiving elements constituting pixels of the optical sensor module is at least four.

16. The control method of claim 13, wherein light receiving elements, among the plurality of light receiving elements of the optical sensor module, corresponding to a first pixel among a plurality of pixels of the optical sensor module are configured to sense different wavelength bands.

17. The control method of claim 13, wherein light receiving elements, among the plurality of light receiving elements of the optical sensor module, corresponding to a first pixel are configured to sense a same wavelength band.

18. The control method of claim 13, wherein the acquiring the feature information comprises:

acquiring the feature information based on intensities of lights for the different wavelength bands sensitive to the plurality of light receiving elements and a difference among intensities of lights corresponding to adjacent wavelength bands among the different wavelength bands.

19. The control method of claim 13, wherein the acquiring the feature information comprises:

reducing a dimension of the spectroscopic data by using linear discriminant analysis; and acquiring the feature information based on the spectroscopic data in which the dimension of the spectroscopic data is reduced.

20. The control method of claim 13, further comprising:

acquiring depth information corresponding to the one or more clothes items accommodated in the clothes care chamber by using the optical sensor module; and acquiring wrinkle information for the one or more clothes items accommodated in the clothes care chamber based on the depth information, wherein the determining the operation course of the clothes care apparatus comprises:

determining the operation course of the clothes care apparatus based on the information on the materials of the one or more clothes items and the wrinkle information.

* * * * *